United States Patent [19]

Loizeau

[11] Patent Number: 4,560,366

[45] Date of Patent: Dec. 24, 1985

[54] TORSIONAL DAMPER

[75] Inventor: Pierre Loizeau, Ville D'Avray, France

[73] Assignee: Valeo, Paris, France

[21] Appl. No.: 577,720

[22] Filed: Feb. 7, 1984

[30] Foreign Application Priority Data

Feb. 21, 1983 [FR] France .................. 83 02768

[51] Int. Cl.$^4$ .......................... F16D 3/14; F16D 3/66
[52] U.S. Cl. .................. 464/68; 192/70.17; 192/106.1; 192/106.2; 464/64; 464/83
[58] Field of Search ................. 464/62–68, 464/85, 83; 192/106.1, 106.2, 70.17

[56] References Cited

U.S. PATENT DOCUMENTS

| | | | |
|---|---|---|---|
| 2,533,789 | 12/1950 | Goodchild | 464/85 |
| 3,809,198 | 5/1974 | Mori | 192/106.2 |
| 4,018,320 | 4/1977 | Schrape et al. | 464/68 X |
| 4,156,481 | 5/1979 | Ishida et al. | 464/85 X |
| 4,301,907 | 11/1981 | Carpenter et al. | 464/68 X |
| 4,368,812 | 1/1983 | Steeg | 464/68 X |
| 4,406,357 | 9/1983 | Nagane et al. | 192/106.2 |
| 4,433,770 | 2/1984 | Loizeau et al. | 192/106.2 |

FOREIGN PATENT DOCUMENTS 2521244 8/1983 France .
715512 9/1954 United Kingdom .

*Primary Examiner*—John Petrakes
*Attorney, Agent, or Firm*—Charles A. Brown; Charles E. Brown

[57] ABSTRACT

A torsional damper comprises at least two coaxial parts rotatable relative to one another within predetermined limits. A plurality of circumferentially acting elastic means are disposed between them in the circumferential direction. These elastic means comprise at least one block of elastic material extending in a substantially tangential direction. The or each elastic material block is partially housed, without circumferential clearance in a rest configuration of the damper, in an opening formed for this purpose in a first of the coaxial parts. It is further partially housed, with circumferential clearance in this rest configuration and for at least one circumferential direction, in an opening formed for this purpose in a second of the coaxial parts. The elastic material block carries at least one elastic material peg projecting from it in at least this circumferential direction. Its corresponding circumferential end is at least partly covered by a distribution and retaining plate. This has a notch in its perimeter which is open in the radial direction and through which the elastic material peg passes.

5 Claims, 9 Drawing Figures

TORSIONAL DAMPER

BACKGROUND OF THE INVENTION

1. Field of the invention

The present invention is generally concerned with torsional damper devices comprising at least two coaxial parts mounted to rotate relative to one another within a defined range of relative angular movement against circumferentially acting elastic means disposed circumferentially between them.

2. Description of the prior art

As is known, this type of torsional damper device is normally incorporated in the design of a friction clutch, particularly for automotive vehicles, for example, in which case one coaxial part comprises a friction disk designed to rotate with a first shaft, in practice a driving shaft, the motor output shaft in the case of an automotive vehicle, constituting a part refered to hereinafter for convenience as the driving part, whereas the other of said coaxial parts is carried on a hub design to rotate with a second shaft, in practice a driven shaft, the gearbox input shaft in the case of an automotive vehicle, constituting a part referred to hereinafter for convenience as the driven part.

This type of torsional damper device is used to permit regulated transmission of rotational torque applied to one of its coaxial parts where the other is itself subject to a rotational torque, in other words, to filter vibrations which may arise at any point in the kinematic system in which it is incorporated, extending from the motor to the axles in the case of an automotive vehicle.

The present invention is more particularly directed to the case where the circumferentially acting elastic means disposed between the driving part and the driven part in the circumferential direction comprise at least one block of elastic material extending in a substantially tangential direction relative to a circumference of the damper and partially housed, without circumferential clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts and having at least one elastic material peg projecting from its corresponding circumferential end in said first circumferential direction, this circumferential end being at least partly covered by a distribution and retaining plate, usually of sheet metal, formed with an opening through which said elastic material peg passes.

This is the case, for example, in the torsional damper device which is the subject of French patent application No. 82 02034 filed Feb. 9 1982, now Publication No. 2,521,244, of Aug. 12, 1983.

In the rest configuration of the assembly, the elastic material peg carried by an elastic material block extends circumferentially beyond the distribution and retaining plate through which it passes.

On relative angular movement of the two coaxial parts concerned, it offers the advantage of progressively increasing the stiffness of the circumferentially acting elastic means operative between said coaxial parts before the elastic material block which carries it comes into action in its turn.

In practice, the coaxial part in which the elastic material block is housed with circumferential clearance in the rest configuration of the assembly comprising only one flange, a hub disk, for example, whereas the other comprises two transverse flanges, guide rings, for example, disposed one on each side of the former, the elastic material peg lies substantially in the median transverse plane of the assembly, so that said hub disk can act on it through its edge, said guide rings acting conjointly, by their edge, on the elastic material block, on opposite sides of said peg.

In the French patent application mentioned hereinabove, the elastic material peg extends along the axis of the elastic material block which carries it, being at the center of the corresponding circumferential end of the latter, with the result that the distribution and retaining plate through which it passes is of generally circular annular configuration, constituting a closed loop, the opening in the distribution and retaining plate for said elastic material peg to pass through being itself generally in the center of the plate.

An arrangement of this kind is generally satisfactory.

However, it may prove wanting in certain specific applications, in particular when the torque to be transmitted from the driving part to the driven part is relatively high.

In this case, deterioration of the distribution and retaining plate may sometimes be observed.

The explanation for this may be found in the fact that, being in its center, the opening in it for the elastic material peg to pass through significantly reduces the bearing surface area which it presents to the hub disk after circumferential crushing of said elastic material peg.

A general objective of the present invention is to provide an arrangement whereby this disadvantage may be overcome and other advantages secured.

SUMMARY OF THE INVENTION

The present invention consists in a torsional damper comprising at least two coaxial parts mounted so as to be rotatable relative to one another within predetermined limits of relative angular movement, circumferentially acting elastic means disposed between said coaxial parts in the circumferential direction and comprising at least one block of elastic material extending in a substantially tangential direction relative to a circumference of the damper and partially housed, without circumferential clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts, wherein said at least one elastic material block carries at least one elastic material peg projecting in said first circumferential direction from its corresponding circumferential end which is at least partly covered by a distribution and retaining plate formed with at least one notch in its perimeter which is open in the radial direction and through which said at least one elastic material peg passes.

The overall result of this is that, other things being equal, the remaining bearing surface area which the distribution and retaining plate is able to present to the hub disk is larger.

Thus the distribution and retaining plate is advantageously strengthened with regard to the action on it of the hub disk.

Also, being no longer in the center of the distribution and retaining plate, the opening in the latter for the elastic material peg to pass through may advantageously have, if required, a generally rectangular contour, although a configuration of this kind is normally ruled out where an opening of this kind is at the center of the distribution and retaining plate, since cracking can then commence from the corners.

As a corollary to this, the elastic material peg may itself have a rectangular contour in transverse cross-section, its overall shape being thus that of the frustum of a pyramid instead of that of the frustum of a cone.

Apart from the fact that its manufacture, usually achieved by molding any appropriate elastic synthetic material, may be facilitated, the end of an elastic material peg of this kind on which the edge of the hub disk acts may be readily made flat in this case and so offer an increased bearing surface area to said hub disk, other things being equal, as compared with that which could be offered by a conical or frustoconical elastic material peg.

In practice, the notch constituting the opening in the distribution and retaining plate for the elastic material peg to pass through is open in the radial direction towards the axis of the damper, so that said elastic material peg, which is eccentric relative to the end of the elastic material block which carries it, is itself radially offset in the direction towards the axis of the assembly, in other words, towards the interior of the assembly.

Being thus nearer said axis, the elastic material peg may with advantage be shorter, for a given value of relative angular movement of the coaxial parts concerned, which makes it easier to manufacture, increases its service life and minimizes the provisions which have to be made to accommodate its volume when it is crushed in the circumferential direction when acted on by the hub disk.

The notch in the distribution and retaining plate by means of which the peg passes through the plate has a width in the axial direction which is greater than the thickness of the hub disk, so that the latter may engage in it.

In this case, the coming into action of the elastic material block concerned is advantageously retarded until the hub disk actually bears on the distribution and retaining plate which, other things being equal, provides for maintaining intact the operating characteristics of the assembly due to the action of the circumferentially acting elastic means which come into action before said elastic material block, inspite of the reduction in the length of the elastic material peg carried by the latter, for the reasons stated hereinabove.

If required, standard designs of guide ring and hub disks may be retained.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
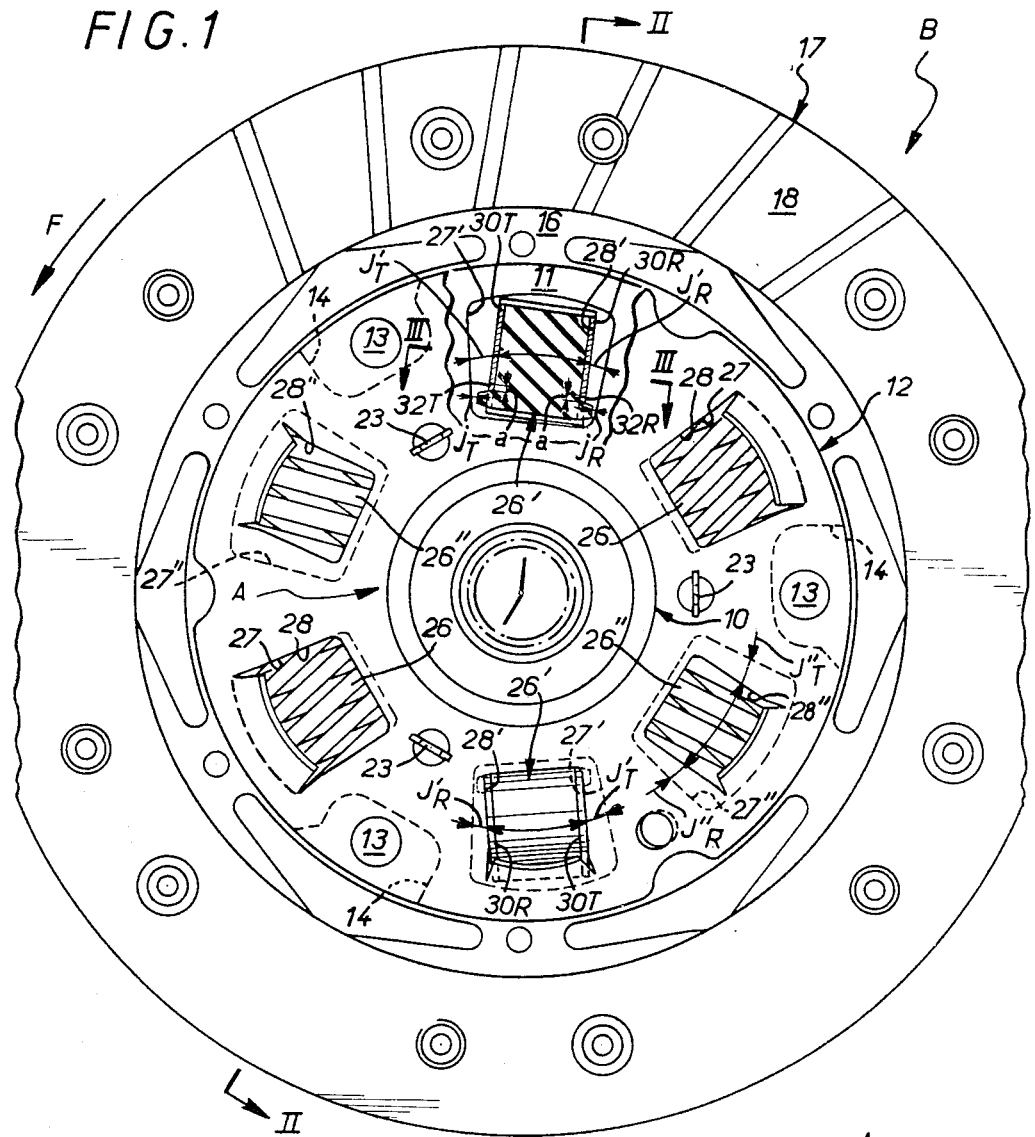
FIG. 1 is a partial view in elevation and partially cutaway of a torsional damper device in accordance with the invention, seen in the direction of the arrow I in FIG. 2.

As shown in these figures, the torsional damper device in accordance with the invention is applied, by way of example, to the construction of a damper hub type friction clutch for automotive vehicles.

In a general manner known per se, the torsional damper device comprises at least two coaxial parts A and B mounted so as to be rotatable relative to one another within predetermined limits of relative angular movement and against elastic means disposed between them in the circumferential direction and referred to hereinafter, for convenience, as circumferentially acting elastic means.

In the embodiment shown, there are only two coaxial parts A and B.

The coaxial part A, which in practice constitutes the driven part, comprises, in the embodiment shown, a hub 10 which, internally splined, for example and as shown here, is designed to be constrained to rotate with a shaft, in practice a driven shaft, the gearbox input shaft in the case of an automotive vehicle, and a hub disk 11 which is rigidly attached to the hub 10, being crimped to the latter, for example, as shown here.

Coaxial part B, which in practice constitutes the driving part, comprises, in the embodiment shown, two guide rings 12 which, disposed on respective opposite sides of the hub disk 11, parallel thereto and spaced therefrom, are rigidly attached together by means of pegs or other spacers 13 which pass with clearance through notches 14 formed for this purpose in the periphery of said hub disk 11.

In the present instance of a friction clutch for automotive vehicles, the coaxial part B further comprises a friction disk assembly 17 attached by its disk 16 to one of the guide rings 12, on the side thereof facing the hub disk 11 and attached to this guide ring 12 by the same spacers 13 which attach this guide ring 12 to the other guide ring 12. At the perimeter of each side of the friction disk assembly 17 are friction facings 18 by means of which the friction disk assembly is adapted to be gripped axially between two plates constrained to rotate with a shaft, in practice a driving shaft, the motor output shaft of the vehicle concerned.

In the embodiment shown, the disk 16 of the friction disk assembly 17 is of unitary construction and extends in the radial direction over the entire surface area of the guide ring 12 to which it is coupled; alternatively, it may be subdivided into vanes and extend in the radial direction over only the peripheral area of the guide ring 12 to which it is coupled.

In the following description, for reasons of simplicity, it will more often than not be regarded in the same category as the latter.

In the embodiments shown, on the side of the hub disk 11 facing the friction disk assembly 17 there is disposed, between the internal perimeter of the disk 16 of the latter and of the guide ring 12 to which it is coupled, on the one hand, and the hub 10, on the other hand, a bearing 20 attached to which is a radial flange 21 inserted axially between said hub disk 11 and disk 16 of the friction disk assembly 17.

Further, in the embodiment shown, there are inserted axially between the hub disk 11 and the other guide ring 12, on the one hand an action ring 22 which is constrained to rotate with said guide ring 12 by axial lugs 23 and carries a friction facing 24 in contact with the hub disk 11 and, on the other hand, between said action ring 22 and said guide ring 12, an axially elastic ring 25 of the kind, for example and as shown here, marketed under the trade name "ONDUFLEX".

These arrangements are well known per se and, as they do not constitute part of the present invention, will not be described in further detail here.

Also in a manner known per se, the circumferentially acting elastic means disposed between the coaxial parts A and B comprise a plurality of elastic members, to be described in detail hereinafter, which all extend substantially tangentially relative to a circumference of the assembly, the same direction for all these members in the embodiment shown, and which are in practice divided into a number of separate groups, of differing stiffness.

There is firstly a first group of elastic members together constituting a first damper stage, of relatively low stiffness.

In the embodiments shown, they are helical coil springs 26, two in number in these embodiments, disposed in substantially diametrically opposite relationship to one another.

Each of the springs 26 is partially housed in an opening 27 formed for this purpose in the driven part A, in practice an opening formed in the hub disk 11 of the latter, and partially in an opening 28, also formed for this purpose in driving part B, in practice openings formed in the guide rings 12 of the latter and in the disk 16 of the friction disk assembly 17.

In the rest configuration of the damper, and as shown in FIG. 1, the springs 26 are disposed without circumferential clearance in their openings 27, 28 and the latter are axially superposed on one another.

As will become clear hereinafter, it results from this that, on relative angular movement between the driving part B and the driven part A, these springs 26 operate in the same manner.

As an alternative to this, and in a manner known per se, there may be provided for each of them a circumferential offset between their openings 27, 28, in one direction for one of them and in the opposite direction for the other, so that, being thus mounted in opposition, one is compressed when the other expands and vice versa on relative angular movement between the driving part B and the driven part A.

In the embodiments shown, the second group of elastic members disposed in the circumferential direction between the driving part B and the driven part A comprises, on the one hand, blocks 26' of elastic material, an elastomer, for example, and, on the other hand, helical coil springs 26″, said elastic material blocks 26' and said springs 26″ together constituting a second damper stage of relatively high stiffness and, in all cases, of significantly higher stiffness than the first damper stage formed by the aforementioned springs 26.

Like the springs 26, the elastic material blocks 26', of which there are two in the embodiments shown, are disposed in substantially diametrically opposed relationships to one another, each partially housed in an opening 27' formed for this purpose in the driven part A, in practice an opening formed in the hub disk 11 which the latter comprises, and partially in an opening 28' also formed for this purpose in the driving part B, in practice an opening formed in the guide rings 12 which the latter comprises and in the disk 16 of the friction disk assembly 70.

In the embodiments shown, each of the elastic material blocks 26' is, in the rest configuration of the damper, disposed without circumferential clearance in its opening 28' in the driving part B and with circumferential clearance in its opening 27' in the driven part A, of value J'T for the circumferential direction corresponding to the more frequent direction of rotation of the damper, which is shown by the arrow F in FIG. 1 and corresponds to forward movement of the vehicle concerned, and of value J'R for the opposite circumferential direction.

As measured in the angular sense, these two values J'T and J'R of circumferential clearance may be equal to one another.

In the embodiments shown, however, the clearance J'T in the circumferential direction assumed to correspond to operation of the damper with increasing torque is greater than the clearance J'R in the opposite circumferential direction, assumed to correspond to operation of the damper with decreasing torque.

The elastic material blocks 26' are of generally circular contour in transverse cross-section, like the springs 26.

At each of their circumferential ends, in order to prevent damage and to position them more accurately, there is associated with them a distribution and retaining plate 30T, 30R, usually of sheet metal, which at least partially covers said circumferential end and which is disposed in the circumferential direction between the latter and the corresponding edge of the corresponding opening 28' in the driving part B.

The distribution and retaining plates 30T, 30R thus associated with an elastic material block 26' are conveniently attached to the latter, by gluing, for example, or bonding, by in situ vulcanization of an elastic material block 26' of this kind between its distribution and retaining plates 30T, 30R.

Like the elastic material blocks 26' they have a generally circular contour.

Figure 6:
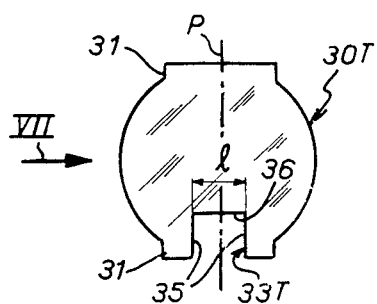
FIG. 6 is a plan view to the same scale as FIG. 5 of a distribution and retaining plate associated with the elastic material block concerned, seen in the direction of the arrow VI in FIG. 7.
Figure 7:
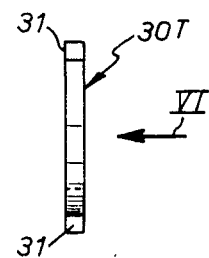
FIG. 7 is an edge view of this distribution and retaining plate, in the direction of the arrow VII in FIG. 6.

However, and as best seen in FIGS. 6 and 7 in the case of one of them, they have radially projecting from this contour, in positions which are diametrically opposite one another, two straight extensions 31 which, inserted between the guide rings 12, advantageously and very simply prevent rotation of the damper relative to the latter.

Like the springs 26 and the elastic material blocks 26', the springs 26″, of which there are two in the embodiments shown, and which are disposed in substantially diametrically opposite relationship to one another, alternating with the springs 26 and the elastic material blocks 26', are each partially housed in an opening 27" formed for this purpose in the driven part A, in practice an opening formed in the hub disk 11 which the latter comprises, and partly in an opening 28" also formed for this purpose in the driving part B, in practice an opening formed in the guide rings 12 which the latter comprises and in the hub disk 16 of the friction disk assembly 17.

In the embodiments shown, and as shown in FIG. 1, in the rest configuration of the damper the springs 26" are disposed without circumferential clearance in their openings 28" in the driving part B and with circumferential clearance in their openings 27" in the driven part A, of value J"T for the circumferential direction indicated by the arrow F in FIG. 1 and of value J"R for the opposite circumferential direction.

In practice, and as for the elastic material blocks 26', the circumferential clearance J"T as measured in the angular sense is greater than the circumferential clearance J"R.

In practice, in the embodiments shown, the clearances J"T, J"R associated in this way with the springs 26" have values respectively greater than the circumferential clearances J'T, J'R associated with the elastic material blocks 26'.

Other arrangements may naturally be adopted.

Also, since these arrangements are well known per se and do not constitute part of the present invention, they will not be described in further detail here.

In a manner which is also known per se, and as disclosed in the aforementioned French patent application No. 82 02034, each of the elastic material blocks 26' employed has at least one peg of elastic material projecting from it in at least a first circumferential direction.

In the embodiments shown, in which, in the rest configuration of the assembly, the elastic material block 26' is disposed with circumferential clearances J'T and J'R in respective opposite circumferential directions in the corresponding opening 27' in the driven part A, there is a respective elastic material peg 32T, 32R for each circumferential direction projecting circumferentially from the corresponding circumferential end of said elastic material block 26'.

The corresponding distribution and retaining plate 30T, 30R has an opening 33T, 33R for the elastic material peg 32T, 32R to pass through.

In practice, the elastic material pegs 32R, 32T pass through the openings 33R, 33T in the distribution and retaining plates 30R, 30T with a clearance a at their periphery (FIG. 1).

In accordance with the invention, said openings 33T, 33R border the contour of the corresponding distribution and retaining plate 30T, 30R, constituting a notch which is open in the radial direction onto said contour.

In the embodiments shown, this notch is radially open on the side towards the axis of the assembly and thus towards the interior of said assembly, and has a generally rectangular contour, its sides 35 extending substantially parallel to the median transverse plane P of the assembly, that is the plane perpendicular to the axis of the assembly which passes through the median area of the hub disk 11, as shown schematically in chain dotted line in FIG. 6, and its bottom 36 extending substantially perpendicularly to this plane, that is to say axially.

For preference, and as shown here, the notch constituting the opening 33T, 33R in a distribution and retaining plate 33T, 33R has an axial width 1 greater than the thickness e of the hub disk 11 so that the corresponding edge of the opening 27' concerned in the flange which constitutes the hub disk 11 may be engaged in the notch 33T, 33R.

In practice, each of the pegs 32R, 32T which an elastic material block 26' comprises is eccentric relative to the circumferential end of the elastic material block from which it extends, bordering the contour of said circumferential end.

As the contour of the notch constituting the opening 33T, 33R in the distribution and retaining plate 30T, 30R for the elastic material peg 32T, 32R to pass through is rectangular, the peg itself has a generally rectangular contour in transverse cross section.

In practice, its overall form is that of the frustum of a pyramid and its flat circumferential end 38 has an axial width 1' at least equal to the thickness e of the hub disk 11, and preferably and as shown here greater than the latter.

In the embodiments shown, the elastic material pegs 32T, 32R are integral with the elastic material block 26' which carries them and they are surrounded at their root on three sides, towards the inside of the corresponding circumferential end of the elastic material block 26', by a groove 39.

In the circumferential direction, the lengths LT, LR of the elastic material pegs 32T, 32R may be of greater or lesser extent.

It is assumed here to be measured from the distribution and retaining plates 30T, 30R like the corresponding circumferential clearances J'T, J'R.

Figure 3:
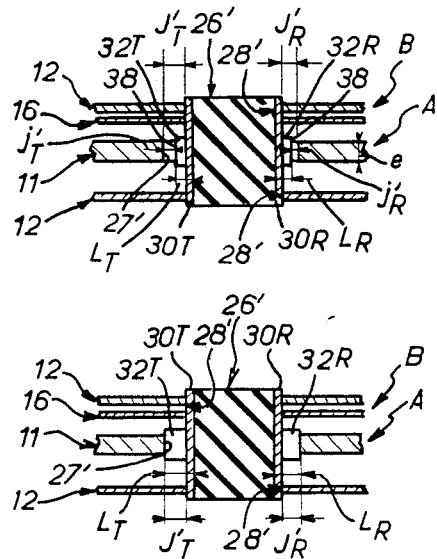
FIG. 3 is a partial view of it in circumferential cross-section on the line III—III in FIG. 1, developed in the flat.

In the embodiment shown in FIGS. 1 to 8, it is relatively reduced, the circumferential end 38 of the elastic material pegs 32T, 32R being, in the rest configuration of the assembly, spaced from the corresponding edge of the opening 27' in the driven part A in which is disposed the elastic material block 26' which carries them, leaving between it and this edge a respective circumferential clearance j'T, j'R (FIGS. 1 and 3).

When, for the rotation direction indicated by the arrow F in FIG. 1 and operation of the assembly with increasing torque, torque is applied to the driving part B, only the springs 26 of relatively lower stiffness yield elastically, and do so immediately.

Figure 8:
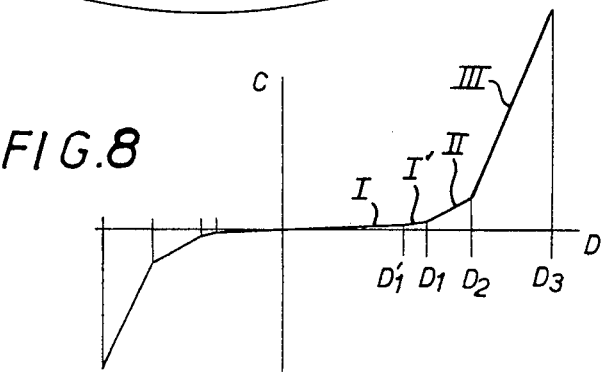
FIG. 8 is a diagram representing the operation of the torsional damper device in accordance with the invention.
Figure 2:
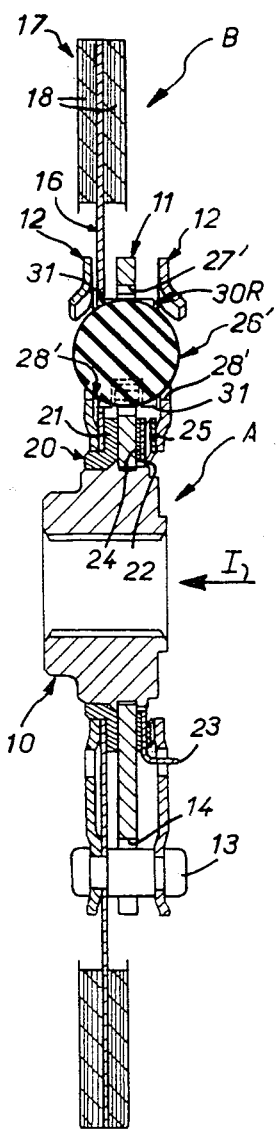
FIG. 2 is a view of it in axial cross-section on the broken line II—II in FIG. 1.

In the graph shown in FIG. 8, the relative angular movement D between the driving part B and the driven part A is plotted on the abscissae against the torque C transmitted from one of these parts to the other, plotted along the ordinates. On this graph, this first phase of operation is represented by a straight line I, the slope of which is proportional to the stiffness of the springs 26.

In the absence of elastic material pegs 32T, this first phase of operation continues until, for a value D1 of the relative angular movement D corresponding to absorption of the circumferential clearance J'T associated with the elastic material blocks 26', the latter come into action in their turn.

However, because of the elastic material pegs 32T, there is first, for a value D'1 of the relative angular movement D corresponding to absorption of the circumferential clearance j'T associated with these elastic material pegs 32T, progressive circumferential crushing of said elastic material pegs 32T, which results in a change in the slope of the line representing this first phase of operation, which continues along a straight line I' the slope of which is slightly greater than that of the preceding line I, the stiffness due to the elastic material pegs 32T being combined with that of the springs 26.

As they are circumferentially crushed, the elastic material pegs 32T are conjointly expanded laterally, and the clearance a initially left between them and the notch forming the opening 33T in the corresponding distribution and retaining plate 30T is made sufficient to be able to absorb such expansion, although it will be understood that, by virtue of arrangements which do not constitute part of the present invention and thus are not described in detail here, the groove 39 at the root of the elastic material pegs 32T may also contribute to the absorption of the latter.

When, for the value D1 of the relative angular movement D, the circumferential clearance J'T associated with the elastic material blocks 26' is absorbed, and following penetration into the notch constituting the opening 33T in the distribution and retaining plate 30T of the corresponding edge of the opening 27', the hub disk 11 comes into surface to surface contact with the part of the distribution and retaining plates 32T constituting a radial extension of the notch, said elastic material blocks 26' in turn come into action, adding their effect to that of the springs 26 and the elastic material pegs 32T which, as previously, remain compressed.

The curve representing the second phase of operation which begins at this time is a straight line II the slope of which is proportional to the combined stiffness and thus much greater than that of the previous lines I and I'.

The second phase of operation continues until, for a value D2 of the relative angular movement D corresponding to absorption of the circumferential clearance J'T associated with the springs 26", these springs 26" in turn come into action and add their effect to that of the springs 26, the elastic material pegs 32T and the elastic material blocks 26' which, as previously, remain conjointly compressed.

In the graph shown in FIG. 8, the curve representing the third phase of operation which begins at this time is a straight line III the slope of which is proportional to the combined stiffness.

This third phase of operation in turn continues until, for a value D3 of the relative angular movement D, the driven part A is driven directly by the driving part B, either because at least some of the springs 26, 26" have their turns contiguous or because the spacers 15 then come into contact with the corresponding edge of the notches 16 in the hub disk 11 through which they pass.

For operation of the assembly with reducing torque, the torque between the coaxial parts A and B reverses and, after retrograde rotational movement of the driving part B relative to the driven part A, a process similar to that described previously occurs, it being understood that at this time it is the elastic material pegs 32R which act.

It will be understood that in the foregoing, for reasons of simplification, no account has been taken of the well known hysteresis phenomenon which, due to friction between the coaxial parts A and B, results in a difference between the value of the torque transmitted between these coaxial parts A and B for increasing relative angular movement between them as compared with the torque transmitted between these coaxial parts for decreasing relative angular movement.

Figure 9:
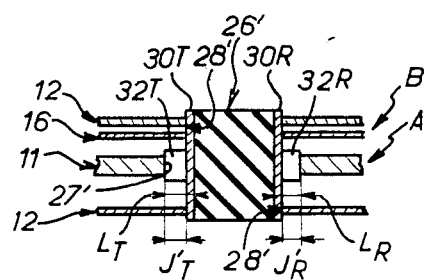
FIG. 9 is a view analogous to that of FIG. 3 and relates to an alternative embodiment.
Figure 4:
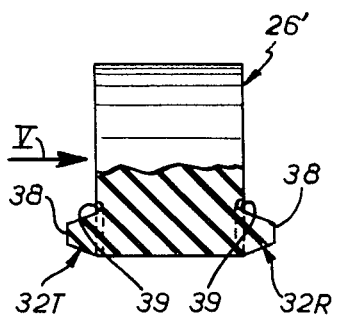
FIG. 4 is a view to a larger scale partly in elevation and partly in longitudinal cross-section on the broken line IV—IV in FIG. 5 of one of the elastic material blocks employed in the torsional damper device in accordance with the invention.
Figure 5:
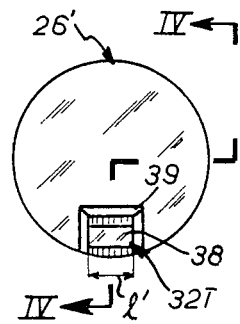
FIG. 5 is an end-on view of this elastic material block, seen in the direction of the arrow V in FIG. 5.

In the embodiment shown in FIG. 9 and by virtue of arrangements which do not form part of the present invention and thus will not be described in detail here, the circumferential lengths LT, LR of the elastic material pegs 32T, 32R are sufficient for their free end to be in contact with the corresponding edge of the openings 27' in which the elastic material blocks 26" which carries them are disposed, in the rest configuration of the assembly.

By virtue of this, they come into action as soon as there is any relative angular movement between the coaxial parts A and B, either in association with the relatively lower stiffness springs 26 or instead of these.

It will be understood that various changes in the details, materials and arrangements of parts, which have been herein described and illustrated in order to explain the nature of the invention, may be made by those skilled in the art within the principle and scope of the invention as expressed in the appended claims.

Also, the application of the invention is not limited to torsional damper devices comprising only two coaxial parts mounted rotatably relative to one another, but also covers cases where a torsional damper device of this kind comprises a greater number of coaxial parts mounted to rotate relative to one another in pairs.

Finally, the invention is not limited to friction clutch mechanisms for automotive vehicles, being more generally applicable to any type of torsional damper device.

I claim:

1. A torsional damper comprising at least two coaxial parts mounted so as to be rotatable relative to one another within predetermined limits of relative angular movement, multiple stage circumferentially acting elastic means disposed between said coaxial parts in the circumferential direction and including at least one block of elastic material extending in a substantially tangential direction relative to a circumference of the damper and partially housed, without circumferential clearance in a rest configuration of the damper, in an opening formed for this purpose in a first of said coaxial parts, and partially housed, with circumferential clearance in said rest configuration and for at least a first circumferential direction, in an opening formed for this purpose in a second of said coaxial parts, wherein at least one said elastic material block has at least one elastic material peg projecting from it in said first circumferential direction from its corresponding circumferential end which is partly covered by a distribution and retaining plate formed with a notch in its peripheral margin which is open in the radial direction and through which said elastic material peg passes, said peg defining a low damping stage adapted to intervene for smaller relative angular displacements of the coaxial parts than the rest of the associated elastic material.

2. A torsional damper according to claim 1, wherein said notch is open in the radial direction towards the axis of the damper.

3. A torsional damper according to claim 1, wherein said notch is of generally rectangular shape, having sides extending substantially parallel to the median transverse plane of the damper and a bottom substantially perpendicular to said median transverse plane.

4. A torsional damper according to claim 3, wherein the coaxial part in which said at least one said elastic material block is housed with circumferential clearance in the rest configuration of the damper comprises a transverse flange and the width of said notch in the axial direction is greater than the thickness of said flange.

5. A torsional damper according to claim 1, wherein said at least one elastic material peg is eccentric relative to the circumferential end of said at least one elastic material block from which it extends.

* * * * *